(12) United States Patent
Selvanayagam

(10) Patent No.: US 11,416,760 B2
(45) Date of Patent: Aug. 16, 2022

(54) MACHINE LEARNING BASED USER INTERFACE CONTROLLER

(71) Applicant: SAP SE, Walldorf (DE)

(72) Inventor: Rajesh Selvanayagam, Chennai (IN)

(73) Assignee: SAP SE, Walldorf (DE)

( * ) Notice: Subject to any disclaimer, the term of this patent is extended or adjusted under 35 U.S.C. 154(b) by 931 days.

(21) Appl. No.: 16/205,135

(22) Filed: Nov. 29, 2018

(65) Prior Publication Data

US 2020/0175404 A1 Jun. 4, 2020

(51) Int. Cl.
*G06F 9/451* (2018.01)
*G06N 20/00* (2019.01)
*G06N 7/00* (2006.01)

(52) U.S. Cl.
CPC ............. *G06N 7/005* (2013.01); *G06F 9/451* (2018.02); *G06N 20/00* (2019.01)

(58) Field of Classification Search
CPC ......... G06N 7/005; G06N 20/00; G06F 9/451
USPC ............................................. 715/200; 706/12
See application file for complete search history.

(56) References Cited

U.S. PATENT DOCUMENTS

| | | | | |
|---|---|---|---|---|
| 7,152,018 | B2 * | 12/2006 | Wicks ................. | G06F 11/3409 709/224 |
| 2007/0239630 | A1 * | 10/2007 | Davis .................... | G06N 20/00 706/12 |
| 2013/0152001 | A1 | 6/2013 | Lovitt et al. | |
| 2013/0282595 | A1 * | 10/2013 | Vijayaraghavan ... | G06Q 30/016 705/304 |
| 2013/0326413 | A1 | 12/2013 | Croft et al. | |
| 2014/0075336 | A1 | 3/2014 | Curtis et al. | |
| 2014/0201655 | A1 | 7/2014 | Mahaffey et al. | |
| 2015/0178265 | A1 * | 6/2015 | Anderson .......... | H04N 21/4668 704/9 |
| 2016/0189049 | A1 | 6/2016 | Silvestri et al. | |
| 2016/0203415 | A1 | 7/2016 | Chaiyochlarb et al. | |
| 2016/0260017 | A1 | 9/2016 | Jo O Viol Vieira et al. | |
| 2017/0168653 | A1 | 6/2017 | Spiess et al. | |
| 2017/0305434 | A1 | 10/2017 | Ratnasingam | |
| 2017/0364212 | A1 | 12/2017 | Shi et al. | |
| 2018/0174070 | A1 * | 6/2018 | Hoffman ................. | G06T 11/00 |

(Continued)

OTHER PUBLICATIONS

Yongkeun Hwang et al., Mobile App Recommendation with Sequential App Usage Behavior Tracking, Published May 2019 via Journal of Internet Technology, vol. 20, No. 3 , pp. 827-837.*

(Continued)

*Primary Examiner* — Manglesh M Patel
(74) *Attorney, Agent, or Firm* — Mintz Levin Cohn Ferris Glovsky and Popeo, P.C.

(57) ABSTRACT

A method for machine-learning based user interface generation is provided. The method may include training a machine-learning model by processing, with the machine-learning model, a training data that includes one or more sequences of software applications accessed by a user at a client. The machine-learning model may be applied to identify a software application based at least on a probability of the user at the client accessing the software application. A user interface may be generated for display at the client. The user interface may provide, to the user at the client, access to the software application. Related systems and articles of manufacture, including computer program products, are also provided.

18 Claims, 6 Drawing Sheets

(56) References Cited

U.S. PATENT DOCUMENTS

| | | |
|---|---|---|
| 2019/0114151 A1* | 4/2019 | Jacobs ................ G06F 21/6245 |
| 2019/0236410 A1* | 8/2019 | Chaturapruek ...... G06K 9/6218 |
| 2019/0295004 A1* | 9/2019 | Chaturapruek ...... G06K 9/6256 |
| 2020/0272659 A1* | 8/2020 | Pachet ............. H04N 21/44222 |
| 2020/0272913 A1* | 8/2020 | Yu .......................... G06N 20/00 |
| 2020/0327444 A1* | 10/2020 | Negi ........................ G06N 3/08 |
| 2021/0157562 A1* | 5/2021 | Sethi ........................ G06F 8/65 |
| 2021/0357440 A1* | 11/2021 | Shankaranarayana ...................... G06F 40/284 |

OTHER PUBLICATIONS

Agata Nawrocka et al., Application of machine learning in recommendation systems, Published 2018 via IEEE, pp. 328-331.*

Zhen Tu et al., Personalized Mobile App Recommendation by Learning User's Interest from Social Media, Published 2019 via IEEE, pp. 2670-2683.*

* cited by examiner

US 11,416,760 B2

MACHINE LEARNING BASED USER INTERFACE CONTROLLER

TECHNICAL FIELD

The subject matter described herein relates generally to user interfaces and more specifically to a machine-learning model trained to generate a user interface for accessing one or more software applications.

BACKGROUND

The operations of an enterprise may rely on a variety of software applications including, for example, a master data governance (MDG) software application, an enterprise resource planning (ERP) software application, a customer relationship management (CRM) software application, a human resource (HR) software application, a sales and distribution (SD) software application, an enterprise asset management (EAM) software application, and/or the like. These software applications may provide a variety of data processing functionalities including, for example, payroll, time and attendance management, recruiting and onboarding, learning and development, performance and compensation, inventory management, workforce planning, and/or the like. Moreover, at least some of these software applications may be hosted on a cloud platform and available as a software as a service (SaaS) such that the corresponding data processing functionalities may be remotely accessible to multiple clients, for example, over the Internet.

SUMMARY

Systems, methods, and articles of manufacture, including computer program products, are provided for using a machine-learning model to generate a user interface for accessing one or more software applications. In one aspect, there is provided a system. The system may include at least one data processor and at least one memory. The at least one memory may store instructions that result in operations when executed by the at least one data processor. The operations may include: training a first machine-learning model by at least processing, with the first machine-learning model, a first training data, the first training data including one or more sequences of software applications accessed by a user at a client; applying the first machine-learning model to at least identify a first software application based at least on a first probability of the user at the client accessing the first software application; and generating, for display at the client, a user interface providing, to the user at the client, access to the first software application.

In some variations, one or more features disclosed herein including the following features may optionally be included in any feasible combination. The first software application may be identified based at least on the first probability exceeding a threshold value and/or a second probability of the user at the client accessing a second software application.

In some variations, the first machine-learning model may include a probabilistic machine-learning model. The training of the first machine-learning model may include updating, based at least on the one or more sequences of software applications accessed by the user at the client, a probability density for determining the first probability of the user at the client accessing the first software application.

In some variations, a second machine-learning model may be trained by at least processing, with the second machine-learning model, a second training data. The second training data may include one or more sequences of fields in the first software application accessed by the user at the client. The second machine-learning model may be applied to at least identify a first field and a second field of the first software application based at least on a first frequency of the user interacting with the first field and the second field. The user interface may be further generated to include the first field and the second field of the first software application.

In some variations, the second machine-learning model may include a decision tree. The decision tree may link the first field and the second field based at least on the first frequency of the user interacting with the second field after the first field. The decision tree may link the second field to a third field of the first software application based at least on a second frequency of the user interacting with the third field after the second field. The decision tree may link the first field to a fourth field based at least on a third frequency of the user interacting with the fourth field after the first field. The decision tree may link the fourth field to a fifth field based at least on a fourth frequency of the user interacting with the fifth field after the fourth field.

In some variations, the third frequency may exceed the first frequency. The second machine-learning model may be trained to identify the first field and the second field instead of the first field and the fourth field based at least on a first sum of the first frequency and the second frequency being greater than a second sum of the third frequency and the fourth frequency.

In some variations, the second field may be associated with a lesser interaction frequency than the fourth field. The second machine-learning model may be trained to identify the second field instead of the fourth field based at least on the first field and the second field forming a first collection of fields having a greater overall interaction frequency than a second collection of fields formed by the first field and the fourth field.

In some variations, in response to a third field being added to the first software application, the second training data used to train the second machine-learning model may be updated. The second training data may be updated synchronously based at least on the third field being a modifiable field. The second training data may be updated asynchronously based at least on the third field being an unmodifiable field.

In some variations, the second machine-learning model may be trained using a reinforcement training technique comprising Q-learning, Monte Carlo, state-action-reward-state-action (SARSA), deep Q network (DQN), deep deterministic policy gradient (DDPG), asynchronous actor-critic algorithm (A3C), trust region policy optimization (TRPO), and/or proximal policy optimization (PPO).

In some variations, the user interface may include one or more control elements configured to provide the access to the to the first software application. The one or more control elements may include hyperlinks, sliders, list boxes, spinners, drop-down lists, menus, menu bars, toolbars, icons, and/or text boxes.

In another aspect, there is provided a method for using a machine-learning model to generate a user interface for accessing one or more software applications. The method may include: training a first machine-learning model by at least processing, with the first machine-learning model, a first training data, the first training data including one or more sequences of software applications accessed by a user at a client; applying the first machine-learning model to at least identify a first software application based at least on a first probability of the user at the client accessing the first software application; and generating, for display at the client, a user interface providing, to the user at the client, access to the first software application.

In some variations, one or more features disclosed herein including the following features may optionally be included in any feasible combination. The first software application may be identified based at least on the first probability exceeding a threshold value and/or a second probability of the user at the client accessing a second software application.

In some variations, the first machine-learning model may include a probabilistic machine-learning model. The training of the first machine-learning model may include updating, based at least on the one or more sequences of software applications accessed by the user at the client, a probability density for determining the first probability of the user at the client accessing the first software application.

In some variations, the method may further include: training a second machine-learning model by at least processing, with the second machine-learning model, a second training data, the second training data including one or more sequences of fields in the first software application accessed by the user at the client; applying the second machine-learning model to at least identify a first field and a second field of the first software application based at least on a first frequency of the user interacting with the first field and the second field; and generating the user interface to further include the first field and the second field of the first software application.

In some variations, the second machine-learning model may include a decision tree. The decision tree may link the first field and the second field based at least on the first frequency of the user interacting with the second field after the first field. The decision tree may link the second field to a third field of the first software application based at least on a second frequency of the user interacting with the third field after the second field. The decision tree may link the first field to a fourth field based at least on a third frequency of the user interacting with the fourth field after the first field. The decision tree may link the fourth field to a fifth field based at least on a fourth frequency of the user interacting with the fifth field after the fourth field.

In some variations, the third frequency may exceed the first frequency. The second machine-learning model may be trained to identify the first field and the second field instead of the first field and the fourth field based at least on a first sum of the first frequency and the second frequency being greater than a second sum of the third frequency and the fourth frequency.

In some variations, the second field may be associated with a lesser interaction frequency than the fourth field. The second machine-learning model may be trained to identify the second field instead of the fourth field based at least on the first field and the second field forming a first collection of fields having a greater overall interaction frequency than a second collection of fields formed by the first field and the fourth field.

In some variations, the method may further include responding to a third field being added to the first software application by at least updating the second training data used to train the second machine-learning model. The second training data may be updated synchronously based at least on the third field being a modifiable field. The second training data may be updated asynchronously based at least on the third field being an unmodifiable field.

In another aspect, there is provided a computer program product that includes a non-transitory computer readable storage medium. The non-transitory computer-readable storage medium may include program code that causes operations when executed by at least one data processor. The operations may include: training a first machine-learning model by at least processing, with the first machine-learning model, a first training data, the first training data including one or more sequences of software applications accessed by a user at a client; applying the first machine-learning model to at least identify a first software application based at least on a first probability of the user at the client accessing the first software application; and generating, for display at the client, a user interface providing, to the user at the client, access to the first software application.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to the generation of a user interface for accessing one or more software applications, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
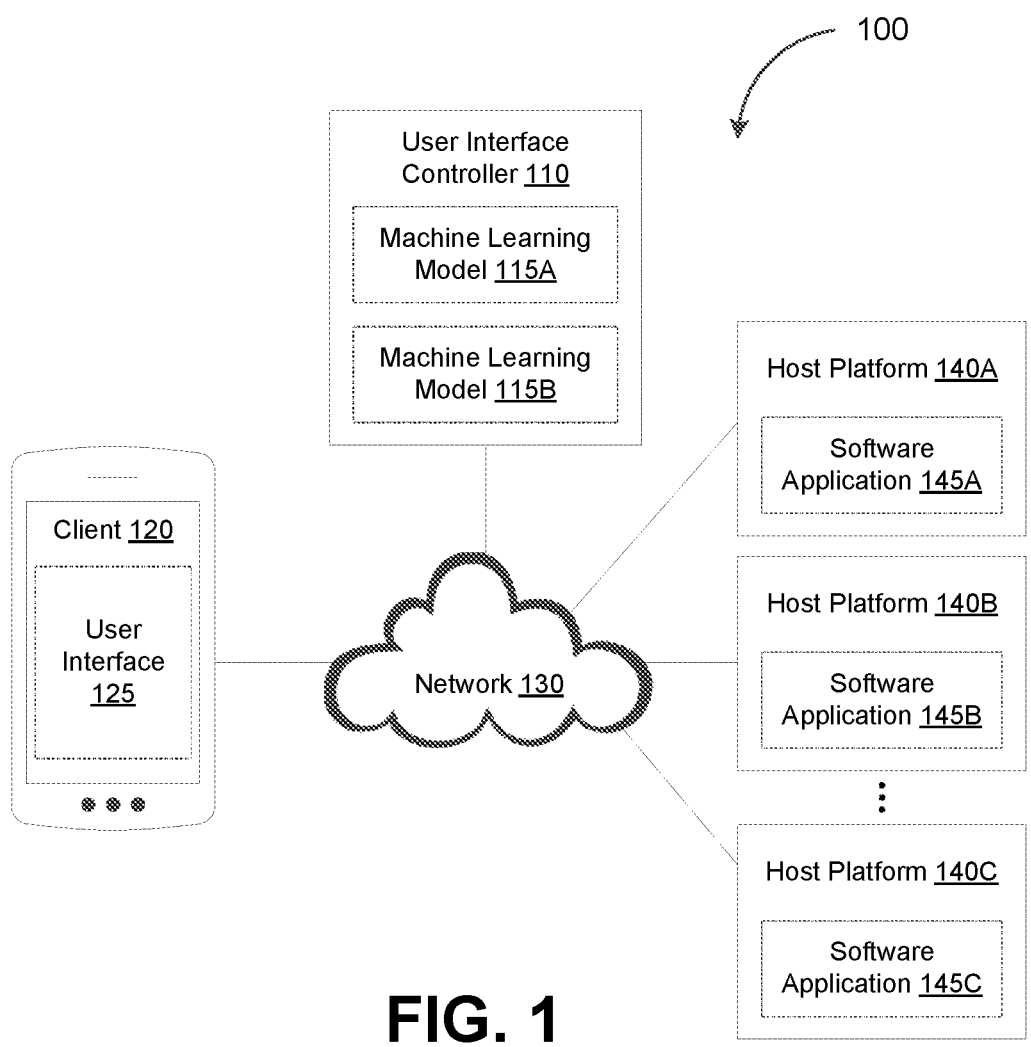
FIG. 1 depicts a system diagram illustrating a machine-learning based user interface system, in accordance with some example embodiments.

The operations of an enterprise may require a user to interact with multiple software applications including, for example, a master data governance (MDG) software application, an enterprise resource planning (ERP) software application, a customer relationship management (CRM) software application, a human resource (HR) software application, a sales and distribution (SD) software application, an enterprise asset management (EAM) software application, and/or the like. For example, the user may perform a process flow that requires the user to interact with a sequence of software applications. Moreover, as part of the process flow, the user may interact with one or more fields in each software application within the sequence of software applications. For example, the user may read the data value in a first field of a first software application before modifying the data value in a second field of a second software application. Nevertheless, the user may interact with only some but not all of the software applications available from the enterprise backend system. Furthermore, the user may interact with some but not all of the fields of these software application. As such, in some example embodiments, one or more machine-learning models may be trained to identify the most relevant software applications and/or fields for the user in order to generate a user interface that consolidates these software applications and/or fields. In doing so, the user may be able to access the most relevant software applications and/or fields through a single user interface instead of having to access each software application and/or field individually.

In some example embodiments, a first machine-learning model may be trained to identify the most relevant software applications for a user by at least recognizing patterns in the software applications accessed by a user. For example, the first machine-learning model may be trained to determine that the user interacts with the first software application before the second software application. A user interface controller may generate, by at least applying the first machine-learning model, a user interface that includes the first software application and/or the second software application. For instance, the user interface controller may generate the user interface to include the first software application and the second software application. Alternatively, the user interface controller may generate the user interface to include the first software application before updating the user interface to display the second software application.

The first machine-learning model may be a probabilistic machine-learning model trained, for example, through unsupervised training, to perform one or more inference tasks including, for example, classification, regression, and/or the like. Accordingly, the first machine-learning model may be trained to predict, based at least on the user interacting with the first software application, a probability of the user subsequently interacting with the second software application. Moreover, the training of the first machine-learning model may include updating, based at least on one or more sequences of software applications accessed by the user, a probability density function capturing the patterns in the software applications accessed by the user. Applying the first machine-learning model may include applying the probability density function to determine, based at least on the user interacting with the first software application, the probability of the user subsequently interacting with the second software application.

In some example embodiments, the user interface controller may generate and/or update the user interface to include the second software application based at least on the probability of the user interacting with the second software application after the first software application. For instance, the user interface controller may generate and/or update the user interface to include the second software application based at least on the probability of the user interacting with the second software application after the first software application being greater than a probability of the user interacting with a third software application after the first software application. Alternatively and/or additionally, the user interface controller may generate and/or update the user interface to include the second software application based at least on the probability of the user interacting with the second software application after the first software application exceeding a threshold value.

Alternatively and/or additionally, a second machine-learning model may be trained to identify the most relevant fields for a user by at least identifying the most frequently accessed fields in a software application. For example, the second machine-learning model may be trained to determine that the user interacts most frequently with a first field and/or a second field of the software application. By applying the second machine-learning model, the user interface controller may generate the user interface to further include the first field and/or the second field of the software application. In some example embodiments, the second machine-learning model may include a decision tree linking the fields in a software application based on a frequency of each of the fields being accessed sequentially by the user. For example, a first link between the first field of the software application and the second field of the software application may be associated with a frequency of the user accessing the second field after the first field. Meanwhile, a second link between the first field of the software application and a third field of the software application may be associated with a frequency of the user accessing the third field after the first field.

In some example embodiments, the second machine-learning model may be trained using a reinforcement learning technique to identify, based on the decision tree, a collection of fields having an overall highest frequency of interaction instead of merely a next field having a highest frequency of interaction. For example, the frequency of the user accessing the third field after the first field may be higher than the frequency of the user accessing the second field after the first field. Nevertheless, the second machine-learning model may be trained to identify the second field instead of the third field as being more relevant to the user along with the first field because the second field is part of a sequence of fields having a highest overall frequency of interaction. Furthermore, the training of the second machine-learning model may prioritize some fields of the software application over others. For instance, the training data used to train the second machine-learning model may be updated synchronously for the addition of a modifiable field but asynchronously for the addition of a non-modifiable (e.g., display-only) field.

FIG. 1 depicts a system diagram illustrating a machine-learning based user interface system 100, in accordance with some example embodiments. Referring to FIG. 1, the machine-learning based user interface system 100 may include a user interface controller 110 and a client 120. The machine-learning based user interface system 100 may further include a plurality of host platforms including, for example, a first host platform 140A, a second host platform 140B, a third host platform 140C, and/or the like. As shown in FIG. 1, the user interface controller 110, the client 120, the first host platform 140A, the second host platform 140B, and/or the third host platform 140C may be communicatively coupled via a network 130. The network 130 may be any wired and/or wireless network including, for example, a wide area network (WAN), a local area network (LAN), a virtual local area network (VLAN), a public land mobile network (PLMN), the Internet, and/or the like.

Referring again to FIG. 1, the client 120 may interact with a plurality of software applications including, for example, a first software application 145A at the first host platform 140A, a second software application 145B, a third software application 145C, and/or the like. The first software application 145A, the second software application 145B, and/or the third software application 145C may be, for example, a master data governance (MDG) software application, an enterprise resource planning (ERP) software application, a customer relationship management (CRM) software application, a human resource (HR) software application, a sales and distribution (SD) software application, an enterprise asset management (EAM) software application, and/or the like. As such, the first software application 145A, the second software application 145B, and/or the third software application 145C may provide a variety of data processing functionalities including, for example, payroll, time and attendance management, recruiting and onboarding, learning and development, performance and compensation, inventory management, workforce planning, and/or the like.

It should be appreciated that the first host platform 140A, the second host platform 140B, and/or the third host platform 140C may be any type of infrastructure capable of hosting the first software application 145A, the second software application 145B, and/or the third software application 145C including, for example, an enterprise backend system, a cloud platform, and/or the like. Moreover, the first software application 145A, the second software application 145B, and/or the third software application 145C may be available as a software as a service (SaaS) such that the data processing functionalities of the first software application 145A, the second software application 145B, and/or the third software application 145C may be remotely accessible to the client 120, for example, via the network 130.

Figure 2:
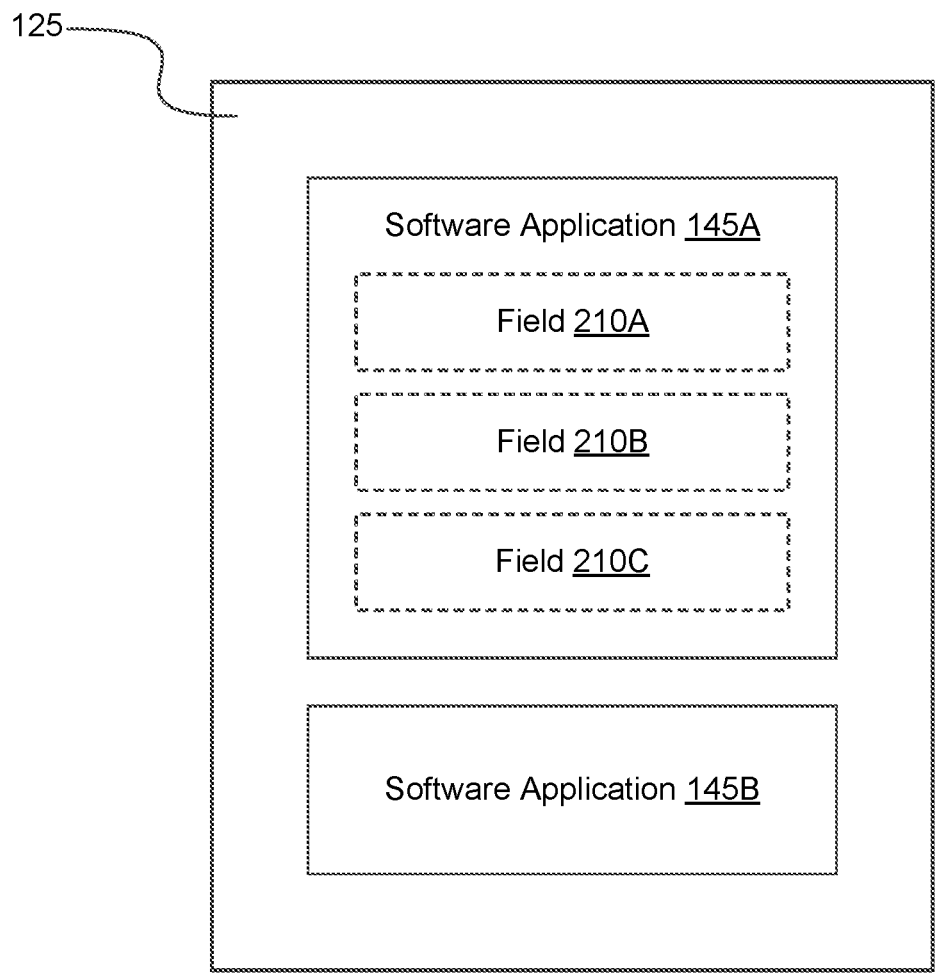
FIG. 2 depicts an example of a user interface generated by a machine-learning model, in accordance with some example embodiments.

The user interface controller 110 may be configured to generate and/or update a user interface 125, which may be displayed at the client 120 to provide access to the first software application 145A, the second software application 145B, and/or the third software application 145C. According to some example embodiments, the user interface controller 110 may generate and/or update the user interface 125 to include the most relevant software applications and/or fields to a user at the client 120. For example, FIG. 2 depicts an example of the user interface 125, in accordance with some example embodiments. As shown in FIG. 2, the user interface controller 110 may generate the user interface 125 to include the first software application 145A and the second software application 145B. Furthermore, FIG. 2 shows that the user interface controller 110 may generate the user interface 125 to include a first field 210A, a second field 210B, and/or a third field 210C of the first software application 145A. It should be appreciated that the user interface 125 may include the first software application 145A, the second software application 145B, the first field 210A, the second field 210B, and/or the third field 210C in any manner. For instance, the user interface 125 may include one or more control elements that may be used to access and/or interact with the first software application 145A, the second software application 145B, the first field 210A, the second field 210B, and/or the third field 210C in any manner. The one or more control elements may include, for example, hyperlinks, sliders, list boxes, spinners, drop-down lists, menus, menu bars, toolbars, icons, text boxes, and/or the like.

The user interface controller 110 may apply one or more machine-learning models in order to identify the most relevant software applications and/or fields to include in the user interface 125. For example, as shown in FIG. 1, the user interface controller 110 may include a first machine-learning model 115A and second machine-learning model 115B. In some example embodiments, the first machine-learning model 115A may be a probabilistic machine-learning model including, for example, a Bayesian network, a belief network, and/or the like. Alternatively and/or additionally, the second machine-learning model 115B may include a decision tree including, for example, a classification tree, a regression tree, and/or the like. However, it should be appreciated that the first machine-learning model 115A and/or the second machine-learning model 115B may be any type of machine-learning model.

In some example embodiments, the first machine-learning model 115A may be a probabilistic machine-learning model trained, for example, through unsupervised training, to perform one or more inference tasks including, for example, classification, regression, and/or the like. For example, the first machine-learning model 115A may be trained to determine, based at least on the user at the client 120 interacting with the first software application 145A, a probability of the user subsequently interacting with the second software application 145B and/or the third software application 145C. The user interface controller 110 may apply the first machine-learning model 115A and identify the first software application 145A and the second software application 145B as being the most relevant to the user at the client 120. For instance, the probability of the user interacting with the second software application 145B after the first software application 145A may exceed a threshold value and/or the probability of the user interacting with the third software application 145C after the first software application 145A. Accordingly, as shown in FIG. 2, the user interface controller 110 may generate the user interface 125 to include the first software application 145A and the second software application 145B but not the third software application 145C.

In some example embodiments, the training of the first machine-learning model 115A may include updating, based at least on training data that includes one or more sequences of software applications accessed by the user at the client 120, a probability density function capturing the patterns in the software applications accessed by the user. As such, applying the first machine-learning model 115A may include applying the probability density function to determine, based at least on the user at the client 120 interacting with the first software application 145A, the probability of the user subsequently interacting with the second software application 145B and/or the third software application 145C.

In some example embodiments, the first machine-learning model 115A may be trained to determine a probability of the user at the client 120 accessing a particular software application y*. Accordingly, the training data used to train the first machine-learning model 115A may include a plurality of data samples corresponding to the one or more sequences of software applications accessed by the user at the client 120. The plurality of data samples may form pairs of (x, y) values in which $x = \{x_i = [x_{i1}, \ldots, x_{id}]\}_{i=1}^n$ may denote the individual features present in each data sample, $y = [y_1 \ldots, y_n]$ may denote the data values associated with the features, d may denote the size of the feature space and/or the dimensionality of the input data 170, and n may denote the quantity of data samples included in training data. It should be appreciated that the size d of the feature space may correspond to a quantity of features $x_i$ associated with each data sample included in the training data. Moreover, the quantity n of data samples included in the training data may increase over time in instances where the first machine-learning model 115A is trained in real time and the probability density function of the first machine-learning model 115A is updated while the user at the client 120 is interacting with one or more software applications.

The probability density function associated with the first machine-learning model 115A may map each feature $x_i$ to a corresponding value $y_i$ in accordance with Equation (1) below:

$$y_i = f(x_i) + \varepsilon_i \quad (1)$$

wherein $\varepsilon_i$ may denote an observation noise that determines how different the values $y_i$ may be from an output of the predictive function $f(x_i)$. The observation noise $\varepsilon_i$ may be modeled as a Normal distribution variable with zero mean and a variance of $\sigma_n^2$. Meanwhile, the predictive function $f(x)$ may be approximated based on Equation (2) below:

$$f(x) = GP(m(x), K(x, x')) \quad (2)$$

wherein $m(x)$ may denote a mean kernel and $K(x, x')$ may denote a covariance kernel. As Equation (2) indicates, the predictive function $f(x)$ may be approximated by a Gaussian process GP of the mean kernel $m(x)$ and the covariance kernel $K(x)$. Mean and covariance may hyper-parameters, which may be the parameters of a prior distribution forming the basis of the predictive function $f(x)$. For instance, correlation between the values $y_i$ may be captured by the mean kernel $m(x)$ and the covariance kernel $K(x)$.

The covariance kernel $K(x)$ may be a squared-exponential kernel expressed by Equation (3) below. It should be appreciated that the covariance kernel $K(x)$ may be selected based on the predictive function $f(x)$.

$$K_{ij}(x) = \sigma_n^2 e(-\tfrac{1}{2}(x_i - x_j)^T \Sigma^{-1}(x_i - x_j)) \quad (3)$$

wherein $\Sigma$ may denote a diagonal positive matrix $\Sigma = \mathrm{diag}[L_1^2, \ldots, L_d^2]$ in which each diagonal element may be a length-scale parameter for a given dimension of the training data. Estimating the length-scale parameters may enable the elimination of irrelevant dimensions that may be uncorrelated with the actual probability of the user at the client 120 accessing a particular software application.

The probability of the user at the client 120 accessing the software application y* may be expressed as $p(y|f, \sigma_n^2)$. Meanwhile, the prior distribution associated with the input data 170 may be expressed as $p(f|\gamma)$ and the posterior distribution associated with the training data for the first machine-learning model 115A may be expressed as $p(\theta|D)$.

As used herein, the prior distribution $p(f|\gamma)$ may refer to the probability of the user at the client 120 accessing the software application y* without taking into account current data samples and the posterior distribution $p(\theta|D)$ may refer to the probability of the user at the client 120 accessing the software application y* given the data samples in the training data.

Determining the probability $p(y|f, \sigma_n^2)$ of the user at the client 120 accessing the software application y* may require computing the posterior distribution $p(\theta|D)$. Here, $\theta = [\gamma, \sigma_n^2]$ may denote the set of hyper-parameters associated with the probability density function associated with the first machine-learning model 115A. As used herein, the hyper-parameter of the probability-density function may refer to the parameters of the prior distribution including, for example, the mean, the covariance, and/or the like. Meanwhile, $\gamma$ may denote one or more hyper-parameters of the predictive function $f(x)$ and $\sigma_n^2$ may, as noted, denote the variance associated with the observation noise $\varepsilon_i$. The inference task being performed by the first machine-learning model 115A (e.g., regression, classification, and/or the like) may be expressed by Equation (4) below:

$$E_{p(\theta|D)}[g(\theta)] = \int g(\theta) p(\theta|D) d\theta \quad (4)$$

wherein $g(\theta)$ may denote a function for identifying, based on the probability of one or more software applications being accessed by the user at the client 120 in sequence, the most relevant software applications to the user at the client 120. Substituting the function $g(\theta)$ with $p(y^*|\theta)$ may enable a prediction of the probability of the user at the client 120 accessing the software application y* based on previously observed data values in accordance with $p(y^*|D) = \int p(y^*|\theta) p(\theta|D) d\theta$.

As noted, to predict the probability of encountering the data value y* may require generating the probability density function for the first machine-learning model 115A, which may in turn require determining the set of hyper-parameters $\theta = [\gamma, \sigma_n^2]$. Where the first machine-learning model 115A is trained in real time using a continuous stream of training data that evolves over time with the addition of new data samples, the probability density function associated with the first machine-learning model 115A may also be updated continuously based on the continuous stream of training data. For example, the probability density function, including the set of hyper-parameters $\theta = [\gamma, \sigma_n^2]$, may be updated to reflect continuous changes in the structural trends present in the training data while new data samples corresponding to user at the client 120 accessing additional software applications are being added to the training data.

Referring again to FIG. 1, the user interface controller may include the second machine-learning model 115B in addition to the first machine-learning model 115A. In some example embodiments, the second machine-learning model 115B may trained to identify, based on a decision tree, the most relevant fields for the user at the client 120 by at least identifying the most frequently accessed fields in, for example, the first software application 145A. For example, the second machine-learning model 115B may be trained to determine that the user interacts most frequently with the first field 210A, the second field 210B, and/or the third field 210C of the first software application 145A. By applying the second machine-learning model 115B, the user interface controller may 110 generate the user interface 125 to further include the first field 210A, the second field 210B, and the third field 210C of the first software application 145A.

Figure 3:
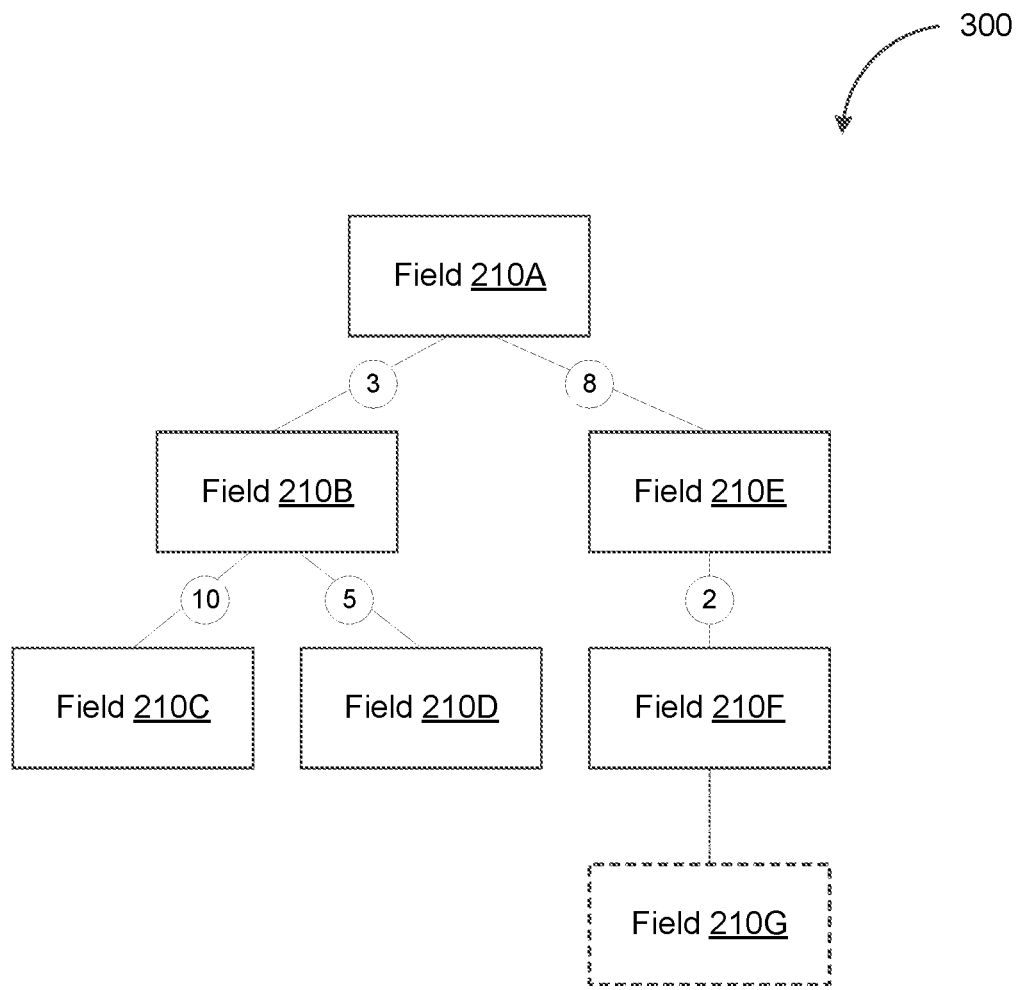
FIG. 3 depicts an example of a decision tree, in accordance with some example embodiments.

As noted, the second machine-learning model 115B may be trained to identify the most relevant fields to the user at the client 120 using a decision tree that links the fields in the first software application 145A based on a frequency of each of the fields being accessed sequentially by the user. To further illustrate, FIG. 3 depicts an example of a decision tree 300, in accordance with some example embodiments. Referring to FIG. 3, the decision tree 300 may include a plurality of nodes, each of which corresponding to a field of the first software application 145A. For example, FIG. 3 shows the decision tree 300 as including nodes corresponding to the first field 210A, the second field 210B, the third field 210C, a fourth field 210D, a fifth field 210E, and a sixth field 210F of the first software application 145A. Each of the first field 210A, the second field 210B, the third field 210C, the fourth field 210D, the fifth field 210E and the sixth field 210F may be configured to hold one or more data values. The user at the client 120 may interact with the first field 210A, the second field 210B, the third field 210C, the fourth field 210D, the fifth field 210E, and the sixth field 210F by at least reading and/or modifying the data values held in the first field 210A, the second field 210B, the third field 210C, the fourth field 210D, the fifth field 210E, and/or the sixth field 210F.

Referring again to FIG. 3, the nodes in the decision tree 300 may be linked based on the frequency with the user at the client 120 accessed the corresponding fields in sequence. For example, as shown in FIG. 3, the link between the first field 210A and the second field 210B may be associated with a frequency of the user at the client 120 accessing the second field 210B after the first field 210A while the link between the first field 210A and the fifth field 210E may be associated with a frequency of the user at the client 120 accessing the fifth field after the first field 210A. The link between the fifth field 210E and the sixth field 210F may be associated with a frequency of the user at the client 120 accessing the sixth field 210F after the fifth field 210E. Alternatively and/or additionally, the link between the second field 210B and the third field 210C may be associated with a frequency of the user accessing the third field 210C after the second field 210B while the link between the second field 210B and the fourth field 210D may be associated with a frequency of the user accessing the fourth field 210D after the second field 210B.

In some example embodiments, the second machine-learning model 115B may be trained using training data that includes one or more sequences of fields of the first software application 145A that the user at the client 120 interacted with. Training the second machine-learning model 115B may include generating the decision tree 300 that includes, as noted, a plurality of nodes corresponding to the field of the first software application 145A and linked based on the frequency of the fields being accessed sequentially by the user at the client 120. Moreover, the second machine-learning model 115B may be trained using a reinforcement learning technique. As used herein, a reinforcement learning technique may refer to any type of machine-learning technique in which a machine-learning model is trained to maximize a reward such as, for example, an overall interaction frequency. Examples of reinforcement learning techniques include Q-learning, Monte Carlo, state-action-reward-state-action (SARSA), deep Q network (DQN), deep deterministic policy gradient (DDPG), asynchronous actor-critic algorithm (A3C), trust region policy optimization (TRPO), proximal policy optimization (PPO), and/or the like.

The second machine-learning model 115B may be trained using a reinforcement training technique to identify a collection of fields from the first software application having a maximum overall frequency of interaction instead of merely a next field having a highest frequency of interaction. For instance, referring to FIG. 3, even though the user at the client 120 accessed the fifth field 210E more frequency than the second field 210B after the first field 210A, the second machine-learning model 115B may be trained to identify the second field 210B instead of the fifth field 210E. The second machine-learning model 115B may further identify the third field 210C to form a collection of fields having the highest overall frequency of interaction. For example, the first field 210A, the second field 210B, and the third field 210C may have a higher overall frequency of interaction than the first field 210A, the second field 210B, and the fourth field 210D as well as the first field 210A, the fifth field 210E, and the sixth field 210F. That is the sum of the frequencies of the user at the client 120 interacting with the first field 210A, the second field 210B, and the third field 210C may be greater than the sum of the frequencies of the user interacting with the first field 210A, the second field 210B, and the fourth field 210D as well as the sum of the frequencies of the user interacting with the first field 210A, the fifth field 210E, and the sixth field 210F.

In some example embodiments, the decision tree 300 may be defined by tuple (S,A), wherein S may denote a finite set of states corresponding to the fields in the first software application 145A and A may denote a finite set of actions that may be performed on each of the fields in the first software application. For example, A may include the finite set $\{A_1, A_2\}$ in which $A_1$ may denote the reading of a data value in a field and $A_2$ may denote the modification of a data value in a field. Meanwhile, a state transition from one state to a next state may correspond to one field in the first software application 145A being accessed after another field in the first software application 145A.

The second machine-learning model 115B may be trained using Q-learning, which is an example of a reinforcement learning technique. The quality Q of a combination of an action performed on a field of the first software application 145A may be expressed as Equation (1) below:

$$Q: S \times A \to \mathbb{R} \quad (1)$$

Prior to commencing the training of the second machine-learning model 115B, the value of Q may be initialized to an arbitrary value. The training of the second machine-learning model 115B may be an iterative process for updating the value of Q. For example, at each time t, an action $a_t$ may be selected to trigger a transition to a new state $s_{t+1}$, the corresponding reward $r_t$ may be observed, and the value of Q may be updated. The iterative update of the value of Q may be expressed by Equation (2) below:

$$Q^{new}(s_t, a_t) \leftarrow (1-\alpha) \cdot Q(s_t, a_t) + \alpha \cdot \left(r_t + \gamma \cdot \max_a Q(s_{t+1}, a)\right) \quad (2)$$

wherein $r_t$ may denote a reward observed for the current state $s_t$, $\alpha$ may denote a learning rate (e.g., $0 \leq \alpha \leq 1$), $\gamma$ may denote the discount factor, $Q(s_t, \alpha_t)$ may denote a value of Q from a previous iteration, and $$\max_a Q(s_{t+1}, a)$$

may correspond to an estimated optimal future value of Q. Referring to Equation (2), it should be appreciated that the $$\left(r_t + \gamma \cdot \max_a Q(s_{t+1}, a)\right)$$

may correspond to a learned value. Meanwhile, the reward $r_t$ may correspond to a cumulative frequency of interaction associated with all state transitions up to time t.

In some example embodiments, the second machine-learning model 115B may be subject to two-track training that prioritizes some fields in the first software application 145A over others. For example, the training data used to train the second machine-learning model 115B may be updated synchronously for the addition of a modifiable field but asynchronously for the addition of a non-modifiable (e.g., display-only) field. As used herein, the user at the client 120 may be able to modify the data value associated with a modifiable field. By contrast, the user at the client 120 may be able to read the data value associated with a non-modifiable field but not make any modifications.

To further illustrate two-track training, FIG. 3 depicts the addition of a seventh field 210G to the first software application 145A. The training data may be updated synchronously in response to the addition of the seventh field 210G if the seventh field 210G is a modifiable field. For example, the synchronous update of the training data may be performed in real time, for example, as an immediate response to the addition of the seventh field 210G. Alternatively, the training data may be updated asynchronously to reflect the addition of the seventh field 210G if the seventh field 210G is a non-modifiable field. The asynchronous update of the training data may be performed with at least some delay, for example, after the user at the client 120 has finished interacting with the first software application 145A.

Referring again to FIGS. 1-3, in some example embodiments, the user interface controller 110 may be configured to generate and/or update the user interface 125 to include the most relevant software applications and/or fields for the user at the client 120, thereby providing a single access point to these software applications and/or fields. For example, as noted, the user interface controller 110 may apply the first machine-learning model 115A to identify the first software application 145A and the second software application 145B as being the most relevant software applications for the user at the client 120. Furthermore, the user interface controller 110 may apply the second machine-learning model 115B to identify the first field 210A, the second field 210B, and the third field 210C as being the most relevant fields of the first software application 145A for the user at the client 120. Accordingly, FIG. 2 shows that the user interface controller 110 may generate and/or update the user interface 125 to include the first software application 145A and the second software application 145B. Alternatively and/or additionally, the first field 210A, the second field 210B, and the third field 210C the user interface controller 110 may generate and/or update the user interface 125 to include the first software application 145A.

Figure 4A:
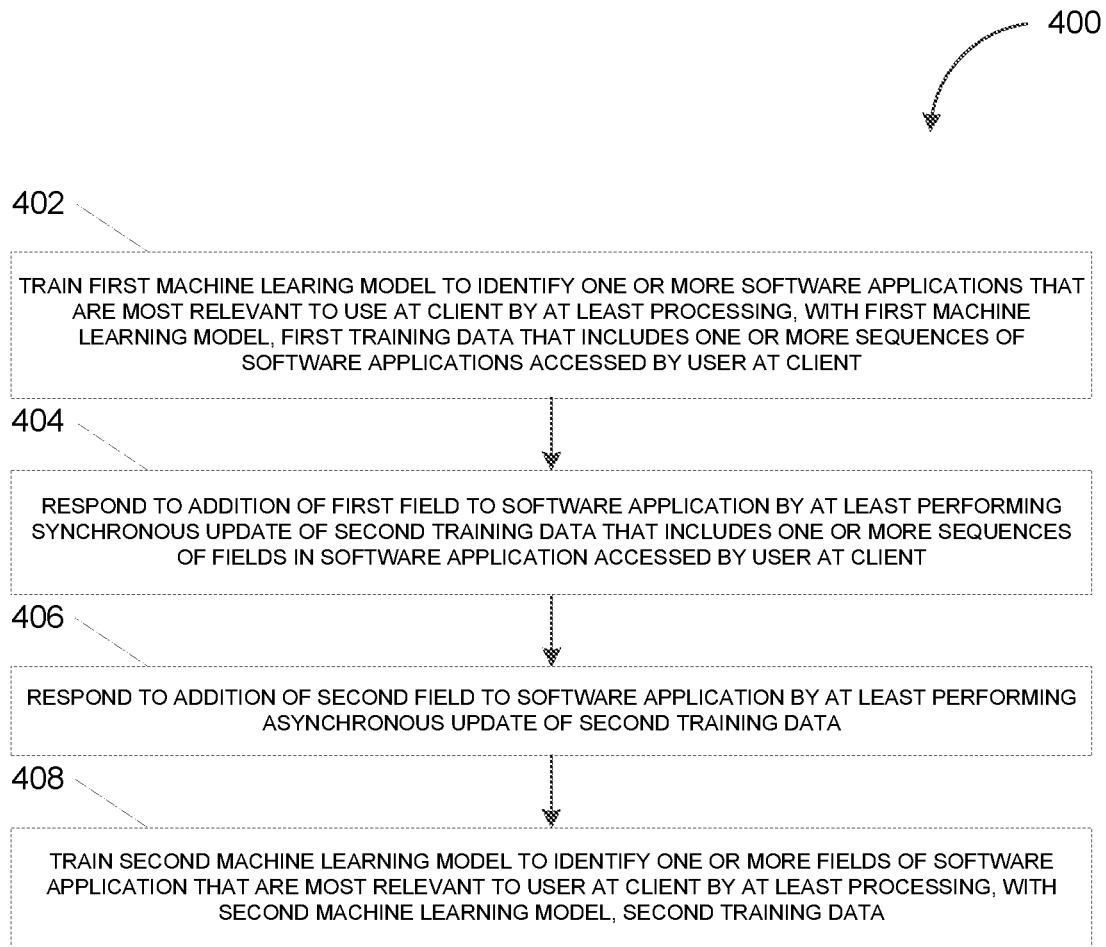
FIG. 4A depicts a flowchart illustrating a process for training one or more machine-learning models to identify relevant software applications and/or fields, in accordance with some example embodiments.

FIG. 4A depicts a flowchart illustrating a process 400 for training one or more machine-learning models to identify relevant software applications and/or fields, in accordance with some example embodiments. Referring to FIGS. 1-3 and 4A, the process 400 may be performed by the user interface controller 110 to train the first machine-learning model 115A and/or the second machine-learning model 115B.

At 402, the user interface controller 110 may train the first machine-learning model 115A to identify one or more software applications that are most relevant to user at the client 120 by at least processing, with the first machine-learning model 115A, a first training data that includes one or more sequences of software applications accessed by the user at the client 120. As noted, the first machine-learning model 115A may be a probabilistic machine-learning model trained, for example, through unsupervised training, to perform one or more inference tasks including, for example, classification, regression, and/or the like. For instance, the first machine-learning model 115A may be a Bayesian network, a belief network, and/or the like. Moreover, the training of the first machine-learning model 115A may include updating, based at least on training data that includes one or more sequences of software applications accessed by the user at the client 120, a probability density function capturing the patterns in the software applications accessed by the user at the client 120. For example, the first machine-learning model 115A may be trained to recognize a pattern that includes the user at the client 120 accessing the first software application 145A and the second software application 145B.

At 404, the user interface controller 110 may respond to an addition of a first field to a software application by at least performing a synchronous update of a second training data that includes one or more sequences of fields in the software application accessed by the user at the client 120. Furthermore, at 406, the user interface controller 110 may respond to an addition of a second field to the software application by at least performing an asynchronous update of the second training data. In some example embodiments, the second machine-learning model 115B may be subject to two-track training that prioritizes at least some fields, for example, in the first software application 145A, over other fields. For example, the two-track training may prioritize modifiable fields over non-modifiable fields. As noted, the user at the client 120 may be able to modify the data value associated with a modifiable field but not the data value associated with a non-modifiable field.

The user interface controller 110 may prioritize modifiable fields by at least updating the training data used to train the second machine-learning model 115B synchronously for the addition of a modifiable field and asynchronously for the addition of a non-modifiable field. For example, as shown in FIG. 3, the training data used to train the second machine-learning model 115B may be updated synchronously in response to the seventh field 210G being added to the first software application 145A if the seventh field 210G is a modifiable field. By contrast, the training data may be updated asynchronously to reflect the addition of the seventh field 210G if the seventh field 210G is a non-modifiable field. It should be appreciated that the synchronous update of the training data may occur in real time, for example, as an immediate response to the addition of the seventh field 210G whereas the asynchronous update of the training data may be performed with at least some delay.

At 408, the user interface controller 110 may train the second machine-learning model 115B to identify one or more fields of the software application that are most relevant to the user at the client 120 by at least processing, with the second machine-learning model 115B, the second training data. In some example embodiments, the second machine-learning model 115B may include the decision tree 300, which may link the fields in the first software application 145A based on a frequency of each of the fields being accessed sequentially by the user. The second machine-learning model 115B may be trained using training data that includes one or more sequences of fields of the first software application 145A accessed by the user at the client 120. As noted, the training data used to train the second software machine-learning model 115B may be updated synchronously and/or asynchronous depending on the field being added to the first software application 145A being a modifiable field or a non-modifiable field. Moreover, the second machine-learning model 115B may be trained using a reinforcement learning technique to identify, as the fields of the first software application 145A that are most relevant to the user at the client 120, a collection of fields having a maximum overall interaction frequency one or more fields having the highest individual interaction frequency.

For example, the second machine-learning model 115B may be trained to identify, based at least on the decision tree 300, the first field 210A, the second field 210B, and the third field 210C as being the most relevant fields of the first software application 145A for the user at the client 120. As FIG. 3 shows, the second machine-learning model 115B may identify the second field 210B instead of the fifth field 210E as being more relevant to the user at the client 120 even though the fifth field 210E is associated with a higher individual interaction frequency than the second field 210B. The second machine-learning model 115B may further identify the second field 210B because the first field 210A, the second field 210B, and the third field 210C to form a collection of fields having the highest overall frequency of interaction. For instance, FIG. 3 shows the first field 210A, the second field 210B, and the third field 210C as having a higher overall frequency of interaction than the first field 210A, the second field 210B, and the fourth field 210D as well as the first field 210A, the fifth field 210E, and the sixth field 210F.

Figure 4B:
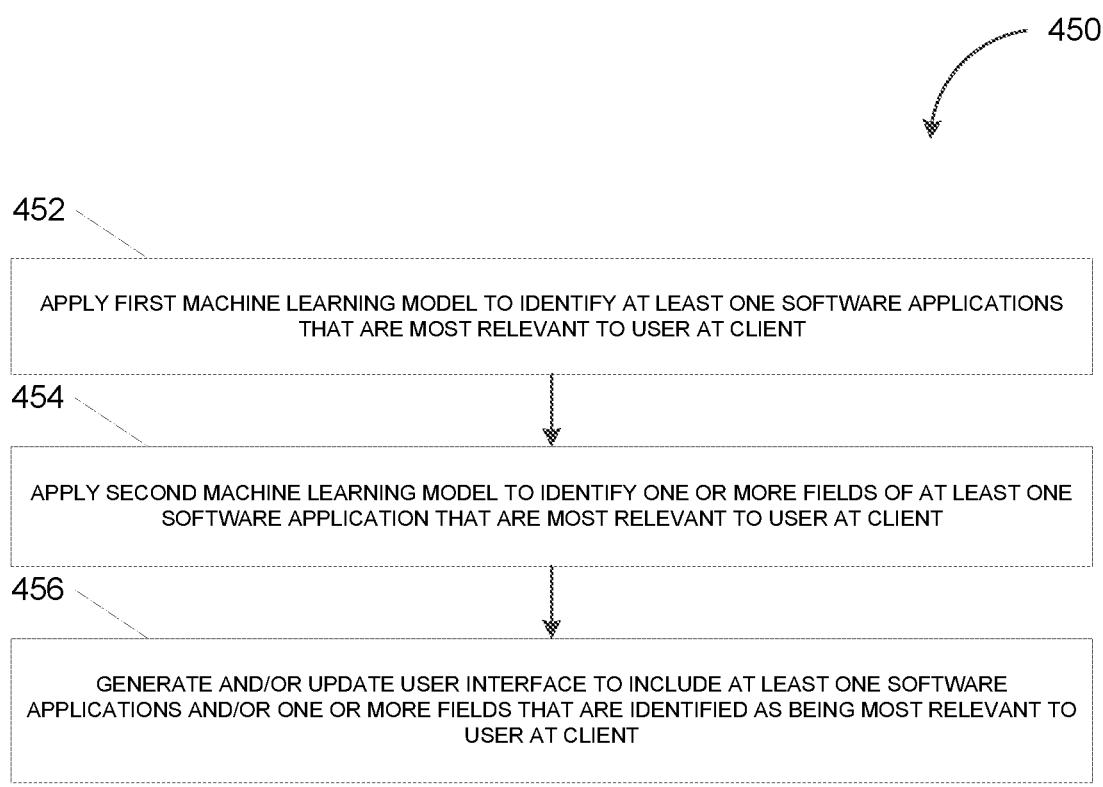
FIG. 4B depicts a flowchart illustrating a process for generating a user interface for accessing one or more software applications, in accordance with some example embodiments.

FIG. 4B depicts a flowchart illustrating a process 450 for generating a user interface for accessing one or more software applications, in accordance with some example embodiments. Referring to FIGS. 1-3 and 4B, the user interface controller 110 may perform the process 450 to generate the user interface 125, which may be displayed at the client 120 to provide access to one or more software applications and/or fields.

At 452, the user interface controller 110 may apply the first machine-learning model 115A to identify at least one software application that are most relevant to the user at the client 120. For example, the user interface controller 110 may apply the first machine-learning model 115A to identify the first software application 145A and the second software application 145B as being the most relevant software applications for the user at the client 120 and not the third software application 145C. As noted, the first machine-learning model 115A may be trained to determine, based at least on the user at the client 120 interacting with the first software application 145A, a probability of the user subsequently interacting with the second software application 145B and/or the third software application 145C. Accordingly, the user interface controller 110 may identify the first software application 145A and the second software application 145B as being the most relevant to the user at the client 120 based at least on the probability of the user interacting with the second software application 145B after the first software application 145A exceeding a threshold value and/or the probability of the user interacting with the third software application 145C after the first software application 145A.

At 454, the user interface controller 110 may apply the second machine-learning model 115B to identify one or more fields of the at least one software application that are most relevant of the user at the client 120. For example, the user interface controller 110 may apply the second machine-learning model 115B to identify the first field 210A, the second field 210B, and the third field 210C of the first software application 145A as being the most relevant to the user at the client 120. The second machine-learning model 115B may be trained to identify a collection of fields from the first software application 145A that have a maximum overall interaction frequency instead of fields having the maximum individual interaction frequency. As such, the second machine-learning model 115B may identify the first field 210A, the second field 210B, and the third field 210C based on the first field 210A, the second field 210B, and the third field 210C having a higher overall frequency of interaction than the first field 210A, the second field 210B, and the fourth field 210D as well as the first field 210A, the fifth field 210E, and the sixth field 210F.

At 456, the user interface controller 110 may generate a user interface to include the at least one software applications and/or the one or more fields that are identified as being most relevant to the user at the client 120. For example, as shown in FIG. 2, the user interface controller 110 may generate and/or update the user interface 125 to include the first software application 145A and the second software application 145B. Although FIG. 2 shows the user interface 125 as simultaneously including the first software application 145A and the second software application 145B, it should be appreciated that the user interface controller 110 may generate the user interface 125 to include only the first software application 145A before updating the user interface 125 to include the second software application 145B in addition to and/or instead of the first software application 145A. Alternatively and/or additionally, the user interface controller 110 may generate and/or update the user interface 125 to include the first field 210A, the second field 210B, and the third field 210C of the first software application 145A.

Figure 5:
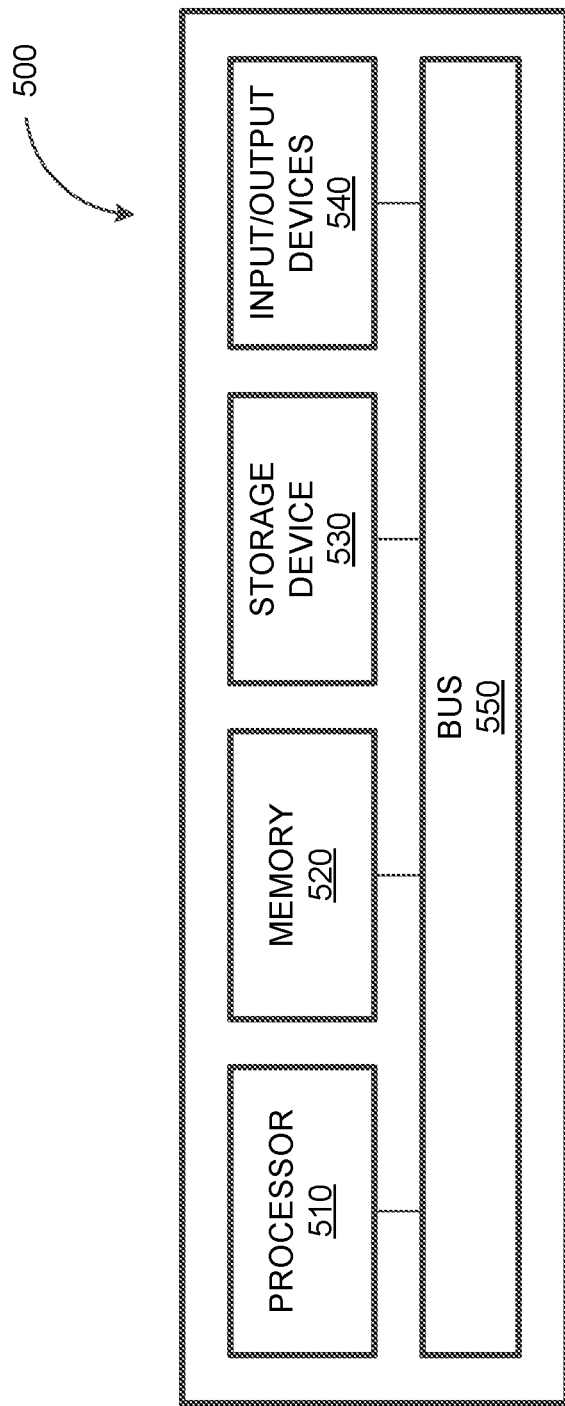
FIG. 5 depicts a block diagram illustrating a computing system, in accordance with some example embodiments.

FIG. 5 depicts a block diagram illustrating a computing system 500 consistent with implementations of the current subject matter. Referring to FIGS. 1 and 5, the computing system 500 can be used to implement the user interface controller 110 and/or any components therein.

As shown in FIG. 5, the computing system 500 can include a processor 510, a memory 520, a storage device 530, and input/output device 540. The processor 510, the memory 520, the storage device 530, and the input/output device 540 can be interconnected via a system bus 550. The processor 510 is capable of processing instructions for execution within the computing system 500. Such executed instructions can implement one or more components of, for example, the user interface controller 110. In some example embodiments, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, a tape device, a solid-state device, and/or any other suitable persistent storage means. The input/output device 540 provides input/output operations for the computing system 500. In some example embodiments, the input/output device 540 includes a keyboard and/or pointing device. In various implementations, the input/output device 540 includes a display unit for displaying graphical user interfaces.

According to some example embodiments, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some example embodiments, the computing system 500 can be used to execute various interactive computer software applications that can be used for organization, analysis and/or storage of data in various formats. Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
   at least one data processor; and at least one memory storing instructions which, when executed by the at least one data processor, result in operations comprising:

training a first machine-learning model by at least processing, with the first machine-learning model, a first training data, the first training data including one or more sequences of software applications accessed by a user at a client;

applying the first machine-learning model to at least identify a first software application based at least on a first probability of the user at the client accessing the first software application;

training a second machine-learning model by at least processing, with the second machine-learning model, a second training data, the second training data including one or more sequences of fields in the first software application accessed by the user at the client;

applying the second machine-learning model to at least identify a first field and a second field of the first software application based at least on a first frequency of the user interacting with the first field and the second field; and generating, for display at the client, a user interface providing, to the user at the client, access to the first software application, the user interface including the first field and the second field of the first software application.

2. The system of claim 1, wherein the first software application is identified based at least on the first probability exceeding a threshold value and/or a second probability of the user at the client accessing a second software application.

3. The system of claim 1, wherein the first machine-learning model comprises a probabilistic machine-learning model, and wherein the training of the first machine-learning model includes updating, based at least on the one or more sequences of software applications accessed by the user at the client, a probability density for determining the first probability of the user at the client accessing the first software application.

4. The system of claim 1, wherein the second machine-learning model comprises a decision tree, wherein the decision tree links the first field and the second field based at least on the first frequency of the user interacting with the second field after the first field, wherein the decision tree links the second field to a third field of the first software application based at least on a second frequency of the user interacting with the third field after the second field, wherein the decision tree links the first field to a fourth field based at least on a third frequency of the user interacting with the fourth field after the first field, and wherein the decision tree links the fourth field to a fifth field based at least on a fourth frequency of the user interacting with the fifth field after the fourth field.

5. The system of claim 4, wherein the third frequency exceeds the first frequency, and wherein the second machine-learning model is trained to identify the first field and the second field instead of the first field and the fourth field based at least on a first sum of the first frequency and the second frequency being greater than a second sum of the third frequency and the fourth frequency.

6. The system of claim 5, wherein the second field is associated with a lesser interaction frequency than the fourth field, and wherein the second machine-learning model is trained to identify the second field instead of the fourth field based at least on the first field and the second field forming a first collection of fields having a greater overall interaction frequency than a second collection of fields formed by the first field and the fourth field.

7. The system of claim 1, further comprising:

responding to a third field being added to the first software application by at least updating the second training data used to train the second machine-learning model.

8. The system of claim 7, wherein the second training data is updated synchronously based at least on the third field being a modifiable field, and wherein the second training data is updated asynchronously based at least on the third field being an unmodifiable field.

9. The system of claim 1, wherein the second machine-learning model is trained using a reinforcement training technique comprising Q-learning, Monte Carlo, state-action-reward-state-action (SARSA), deep Q network (DQN), deep deterministic policy gradient (DDPG), asynchronous actor-critic algorithm (A3C), trust region policy optimization (TRPO), and/or proximal policy optimization (PPO).

10. The system of claim 1, wherein the user interface includes one or more control elements configured to provide the access to the to the first software application, and wherein the one or more control elements comprises hyperlinks, sliders, list boxes, spinners, drop-down lists, menus, menu bars, toolbars, icons, and/or text boxes.

11. A computer-implemented method, comprising:

training a first machine-learning model by at least processing, with the first machine-learning model, a first training data, the first training data including one or more sequences of software applications accessed by a user at a client;

applying the first machine-learning model to at least identify a first software application based at least on a first probability of the user at the client accessing the first software application;

training a second machine-learning model by at least processing, with the second machine-learning model, a second training data, the second training data including one or more sequences of fields in the first software application accessed by the user at the client;

applying the second machine-learning model to at least identify a first field and a second field of the first software application based at least on a first frequency of the user interacting with the first field and the second field; and generating, for display at the client, a user interface providing, to the user at the client, access to the first software application, the user interface including the first field and the second field of the first software application.

12. The method of claim 11, wherein the first software application is identified based at least on the first probability exceeding a threshold value and/or a second probability of the user at the client accessing a second software application.

13. The method of claim 11, wherein the first machine-learning model comprises a probabilistic machine-learning model, and wherein the training of the first machine-learning model includes updating, based at least on the one or more sequences of software applications accessed by the user at the client, a probability density for determining the first probability of the user at the client accessing the first software application.

14. The method of claim 11, wherein the second machine-learning model comprises a decision tree, wherein the decision tree links the first field and the second field based at least on the first frequency of the user interacting with the second field after the first field, wherein the decision tree links the second field to a third field of the first software application based at least on a second frequency of the user interacting with the third field after the second field, wherein the decision tree links the first field to a fourth field based at least on a third frequency of the user interacting with the fourth field after the first field, and wherein the decision tree links the fourth field to a fifth field based at least on a fourth frequency of the user interacting with the fifth field after the fourth field.

15. The method of claim 14, wherein the third frequency exceeds the first frequency, and wherein the second machine-learning model is trained to identify the first field and the second field instead of the first field and the fourth field based at least on a first sum of the first frequency and the second frequency being greater than a second sum of the third frequency and the fourth frequency.

16. The method of claim 15, wherein the second field is associated with a lesser interaction frequency than the fourth field, and wherein the second machine-learning model is trained to identify the second field instead of the fourth field based at least on the first field and the second field forming a first collection of fields having a greater overall interaction frequency than a second collection of fields formed by the first field and the fourth field.

17. The method of claim 11, further comprising:
responding to a third field being added to the first software application by at least updating the second training data used to train the second machine-learning model, the second training data being updated synchronously based at least on the third field being a modifiable field, and the second training data being updated asynchronously based at least on the third field being an unmodifiable field.

18. A non-transitory computer readable medium storing instructions, which when executed by at least one data processor, result in operations comprising:
training a first machine-learning model by at least processing, with the first machine-learning model, a first training data, the first training data including one or more sequences of software applications accessed by a user at a client;
applying the first machine-learning model to at least identify a first software application based at least on a first probability of the user at the client accessing the first software application;
training a second machine-learning model by at least processing, with the second machine-learning model, a second training data, the second training data including one or more sequences of fields in the first software application accessed by the user at the client;
applying the second machine-learning model to at least identify a first field and a second field of the first software application based at least on a first frequency of the user interacting with the first field and the second field; and
generating, for display at the client, a user interface providing, to the user at the client, access to the first software application, the user interface including the first field and the second field of the first software application.

* * * * *